Oct. 22, 1968    E. G. WARREN    3,406,849

VEHICLE CONVEYOR SYSTEM

Filed March 3, 1967

INVENTOR.
EDWIN GUY WARREN
BY
Gardner & Zimmerman
ATTORNEYS

Patented Oct. 22, 1968

3,406,849
VEHICLE CONVEYOR SYSTEM
Edwin Guy Warren, P.O. Box 59,
Hayward, Calif. 94543
Filed Mar. 3, 1967, Ser. No. 620,450
2 Claims. (Cl. 214—83.26)

ABSTRACT OF THE DISCLOSURE

A conveyor system having a plurality of rolls on which an article may be supported and moved, in which the rolls are movable between a first operative position and a second depressed position wherein the upper portions of the rolls are disposed subjacent fixed article supporting members.

Background of the invention

In connection with the loading and unloading of relatively large or heavy articles in a vehicle, several problems are present. The usual vehicle which is utilized for the transportation of such articles has a body with a door or opening at an end thereof through which the articles may be loaded into the vehicle or removed from the vehicle. This is true whether the vehicle consists of a truck, which has been selected as the environment for the following disclosure, an airplane, or other transporting conveyance.

In some instances, loading equipment, such as lift trucks or hand trucks are driven into the vehicle which in itself presents problems. In other arrangements, some form of either fixed or removable roll mechanisms have been utilized to assist in moving the articles from, for example, a rear door and the forward end wall of the vehicle. Some consideration has also been given to the use of vertically movable conveyor rolls which in one position permits support and movement of an article thereon, and in another position are disposed subjacent fixed article supporting members. This latter form of arrangement usually depends on a plurality of vertically disposed jacks for effecting the raising and lowering, the power and space requirements being quite substantial.

Summary of the invention

In accordance with the teachings of the present invention, there is provided a plurality of conveyor rolls which are movable from an upper article supporting and conveying position to an inoperative lower position beneath the level of fixed article supporting members, and in which the means for effecting such movement lies in the general plane of such rolls and requires a minimum amount of power, notwithstanding the weight of an article or articles supported thereon. More particularly, such means incorporates a plurality of inclined ramps along which the conveyor mechanisms may be moved, with the motive power being applied generally horizontally so as to effect a movement along the ramps to gradually raise or lower such mechanism.

Description of the preferred embodiments

For purpose of explanation, the apparatus of my invention has been illustrated in connection with a truck, but it should be made clear at the outset that such apparatus can be incorporated in any other type of vehicle. Actually, such apparatus could be used in a storage room or other stationary installation, but unless there is some movement or vibration, the feature of selectively supporting an article on conveyor rolls and on fixed members would not have any particular advantage. However, since the apparatus could be so used, I prefer to generally denote its environment as a "container," thus incorporating both movable vehicles or stationary buildings, etc.

Figure 1:
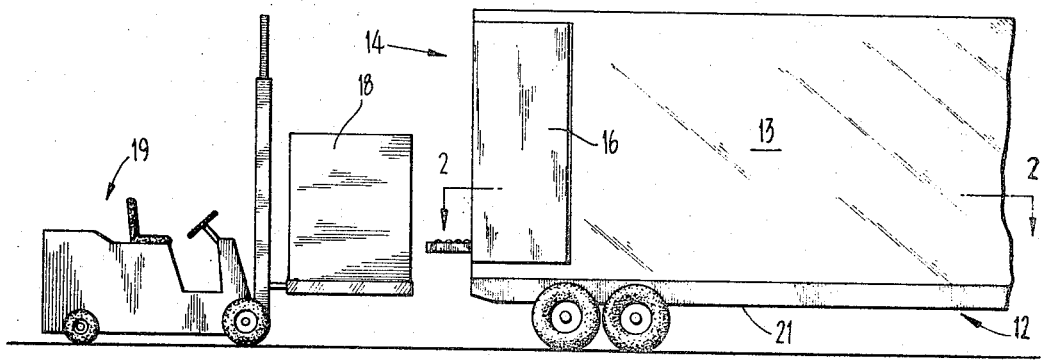
FIGURE 1 is a side elevational view of a loading operation of a truck equipped with the apparatus of the present invention.

As shown in FIGURE 1, the apparatus is shown installed in a truck body 12, the latter including side walls 13, an open rear end 14, and doors 16 (shown in an open position) which may be pivoted to a closed position to enclose the body. A typical conventional manner of loading articles, such as that indicated at 18, is to utilize a lift truck 19 to raise the article to the level of the bed or base 21 of the body, deposit the article on the base, and then manually move the article from adjacent the rear end 14 towards the front end of the vehicle body. Unloading of the article requires an opposite sequence of operations.

To provide for easy movement of heavy articles, either palletized or not, there is provided within the body 12, a conveyor system extending longitudinally along the base 21. This system includes a plurality of parallel adjacent cylindrical rolls 26 journalled on longitudinally extending parallel frame elements 27. Each roller extends generally transversely of the length of the body, and as here illustrated, two sets of such rolls are provided. It will be understood that a single set or more than two sets of the rolls can be provided if desired. It will be noted that the rolls extend above the upper edge 28 of the frame so that when article 18 is placed on one or both sets of rolls, the article may be freely moved along the rolls from the rear to the front of the body and vice versa.

If the sets of rolls were merely placed in the body, any movement of the latter would cause undesirable movement of the articles supported therein, even if the articles were lashed or otherwise secured in position. Any acceleration or deceleration would result in tremendous forces being created, tending to move the article either forwardly or rearwardly within the body. It is accordingly desirable to have the articles resting on a stationary platform or support, rather than on free wheeling rolls at all times other than during loading and unloading operations.

Figure 3:
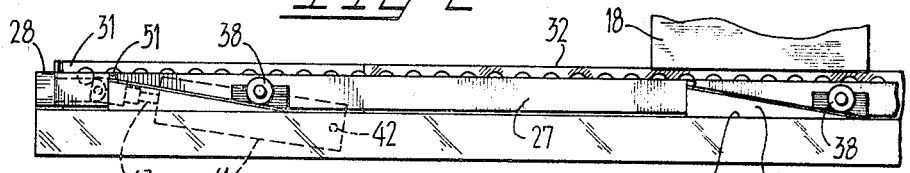
FIGURE 3 is a longitudinal vertical view taken substantially in the plane indicated by line 3—3 of FIGURE 2, and illustrating the conveyor rolls in a lower inoperative position.
Figure 4:
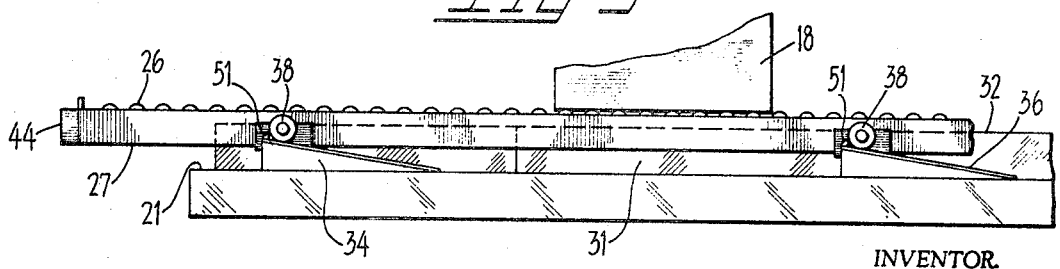
FIGURE 4 is a view similar to FIGURE 3, but showing the conveyor rolls in a raised operative position.

As here shown, there is provided adjacent each of the frames 27, a plurality of fixed platforms 31 supported on base 21, each having an upper article supporting surface 32 disposed in parallel spaced relation to the base. As will now be explained, the roll sets are arranged to be moved from an upper operative position, as illustrated in FIGURE 4, wherein the rolls 26 are disposed above the plane of surface 32, to a lower inoperative position, as illustrated in FIGURE 3, wherein the surface 32 is disposed above the rolls 26. In the former position, the articles 18 may be freely moved along the length of the body, while in the latter, they are effectively seated on solid fixed members for transportation.

The aforesaid roll set movement between its upper and lower position is effected by utilizing a plurality of inclined ramps 34 at longitudinally spaced locations adjacent the frames 27. The ramps are supported on the base 21, and the upper surface 36 of each ramp preferably extends upwardly and rearwardly, forming a small acute angle with the plane of the base. Journalled on each frame 27 is a roller 38 which is rollable along the ramp surface 36. Thus, as the frames are rolled upwardly, the rolls 26 will achieve their upper position, and rearward movement of the frames cause a lowering of the rolls to their inoperative position.

By reason of the small inclination of the ramp and the fact that the entire conveyor assembly is supported on the rollers 38, little power is required to move the frames forwardly and rearwardly. While such power may be supplied in various manners, the construction shown is simple and effective. Disposed between two sets of rolls is a longitudinally extending hydraulic or pneumatic cylinder 41, having its forward end pivoted to the truck base as indicated at 42. A piston rod 43 extends from the cylinder towards the rear of the body with the distal end of the piston operatively connected to an end frame element 44 which traverses and is connected to the side frame elements 27. The connection therebetween preferably comprises a yoked element 46 connected by a pivot pin 47 to an ear 48 of the frame member 44.

Figure 2:
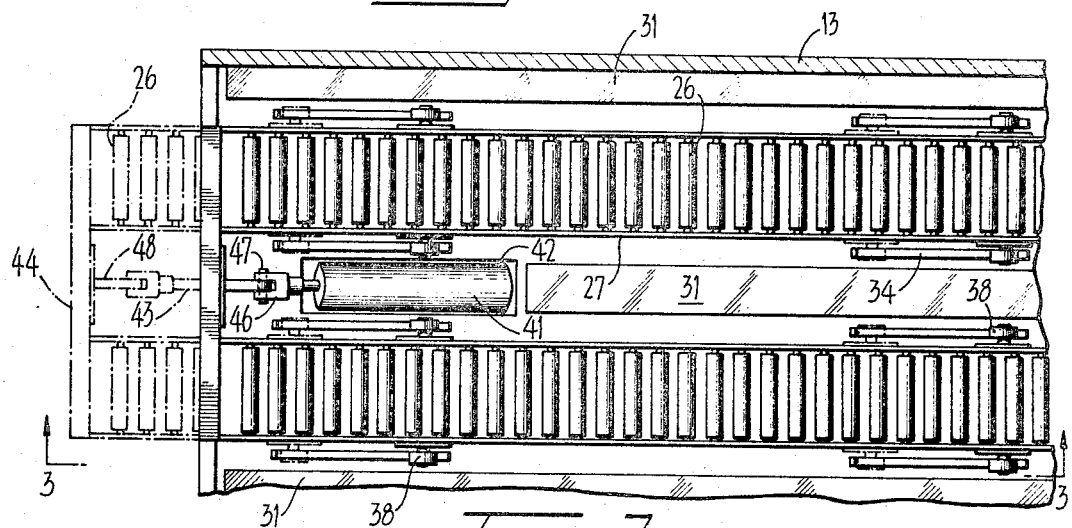
FIGURE 2 is a plan view taken substantially in the plane indicated by line 2—2 of FIGURE 1.

It will thus be seen that upon cylinder actuation, and extension of the piston rod 43 from the solid line representation to the dot-dash line showing of FIGURE 2, the entire frame will be rolled on its rollers 38 in a rearward direction, causing the rollers to roll up the ramps, and positioning the rolls 26 above the surface 32. Suitable cylinder controls and mechanical controls, such as a stop member 51 on surface 36 may be used to limit the degree of movement of the roll sets. Retraction of the piston rod will cause a forward and downward movement of the rolls to their inoperative position.

The frame or roll sets in their lower position preferably extend to adjacent the rear end of the body, and in their upper operative position preferably extend beyond the end of the body. This not only facilitates loading and unloading operations, but also serves to remind the driver or crew not to move the vehicle, since the rolls are in their operative position. In order to close the rear doors 16 or other gates, the rolls will have to be lowered.

What is claimed is:

1. In a vehicle having a body provided with a horizontally disposed base member and an opening at one end of said base member for loading and unloading said body; the combination therewith of a pair of laterally spaced and longitudinally extending article supporting elements positioned in said body in fixed spaced relation above said base member, the ends of said elements being generally coterminous with the end of said base member, a longitudinally extending conveyor member positioned intermediate said pair of elements and including a plurality of article supporting and conveying rolls with each roll having its axis disposed transversely of said base member, a plurality of longitudinally extending ramps forming an acute angle with the plane of said base member mounted on one of said members adjacent each side of said conveyor member, a plurality of rollers journalled on the other of said members and engageable with said ramps, a cylinder mounted on said base member and having a piston extension extending longitudinally of said base member and connected to said conveyor member for moving the conveyor member and the rolls thereof longitudinally of said base member along said ramps, said rolls in one position of said piston being positioned in a plane above the plane of said elements with the end of said conveyor member extending longitudinally beyond said body opening, and said rolls in another position of said piston being positioned in a plane below the plane of said elements with the end of said conveyor member generally coterminous with the end of said base member.

2. Apparatus as set forth in claim 1 in which a pair of said conveyor members are used with one of said supporting elements positioned therebetween, said cylinder being disposed intermediate said conveyor members and said piston being operatively connected to both conveyor members for effecting unitary longitudinal and vertical movement upon piston actuation.

References Cited

UNITED STATES PATENTS 2,828,027   3/1958   Stevenson et al.
3,243,029   3/1966   Oliver _____ 193—35

EVON C. BLUNK, *Primary Examiner.*

M. L. AJEMAN, *Assistant Examiner.*